United States Patent
Kawabe (10) Patent No.: US 7,263,212 B2
(45) Date of Patent: Aug. 28, 2007

(54) GENERATION OF RECONSTRUCTED IMAGE DATA BASED ON MOVED DISTANCE AND TILT OF SLICE DATA

(75) Inventor: Shigeru Kawabe, Tokyo (JP)

(73) Assignee: NEC Corporation, Tokyo (JP)

( * ) Notice: Subject to any disclaimer, the term of this patent is extended or adjusted under 35 U.S.C. 154(b) by 750 days.

(21) Appl. No.: 10/656,261

(22) Filed: Sep. 8, 2003

(65) Prior Publication Data

US 2004/0052407 A1  Mar. 18, 2004

(30) Foreign Application Priority Data

Sep. 18, 2002  (JP) .............................. 2002-272345

(51) Int. Cl.
  *G06K 9/00*  (2006.01)
  *G06K 9/32*  (2006.01)
(52) U.S. Cl. ..................................... 382/124; 382/294
(58) Field of Classification Search ................ 382/116, 382/124, 126, 289, 294; 713/186; 348/308
See application file for complete search history.

(56) References Cited

U.S. PATENT DOCUMENTS

| | | | | |
|---|---|---|---|---|
| 5,467,403 | A * | 11/1995 | Fishbine et al. | 382/116 |
| 6,175,923 | B1 * | 1/2001 | Bailey | 713/186 |
| 6,687,391 | B1 * | 2/2004 | Scott et al. | 382/126 |
| 7,003,142 | B1 * | 2/2006 | Kruse | 382/124 |
| 2002/0012057 | A1 * | 1/2002 | Kimura | 348/308 |

FOREIGN PATENT DOCUMENTS

| | | |
|---|---|---|
| JP | 6-309440 | 11/1994 |
| JP | 7-192086 | 7/1995 |
| JP | 9-106447 | 4/1997 |
| JP | 10-63870 | 3/1998 |
| JP | 10-91769 | 4/1998 |
| JP | 10-108003 | 4/1998 |
| JP | 2000-259825 | 9/2000 |
| JP | 2001-243465 | 9/2001 |
| JP | 2002-42136 | 2/2002 |
| JP | 2002-190942 | 7/2002 |
| JP | 2002-204342 | 7/2002 |
| JP | 2002-216116 | 8/2002 |
| JP | 2002-366950 | 12/2002 |
| KR | 2001-0070576 | 7/2001 |

* cited by examiner

*Primary Examiner*—Kanjibhai Patel
(74) *Attorney, Agent, or Firm*—Young & Thompson (57) ABSTRACT

An image processing apparatus is capable of generating distortion-free accurate image data. The image processing apparatus has an image entering unit, an image processor, and a memory. Slice data read by the image entering unit is stored in the memory. The image processor determines whether the slice data stored in the memory is of significance or not. Then, the image processor calculates a moved distance and tilt of the slice data that has been detected as being of significance, and calculates positional coordinates of a reconstructed image area to which the slice data is to be projected, based on the moved distance and tilt of the slice data which have been calculated, and generates reconstructed image data. The generated reconstructed image data is stored in the memory.

9 Claims, 10 Drawing Sheets

GENERATION OF RECONSTRUCTED IMAGE DATA BASED ON MOVED DISTANCE AND TILT OF SLICE DATA

BACKGROUND OF THE INVENTION

1. Field of the Invention

The present invention relates to an image processing apparatus, an image processing method, and a program.

2. Description of the Related Art

With the widespread use of information processing devices in recent years, it has been more customary than ever before for people to carry small-size information terminals that store highly confidential information. Using biological characteristics of the user of an information terminal as an authentication technique to protect such confidential information is one of the best approaches to prevent others from "impersonating" the user. Of various biological authentication techniques, fingerprint authentication in particular is promising in that it allows information terminals to be easily reduced in size, the cost required to construct fingerprint authentication devices is relatively low, and fingerprints differ from person to person and do not change with time.

Figure 1A:
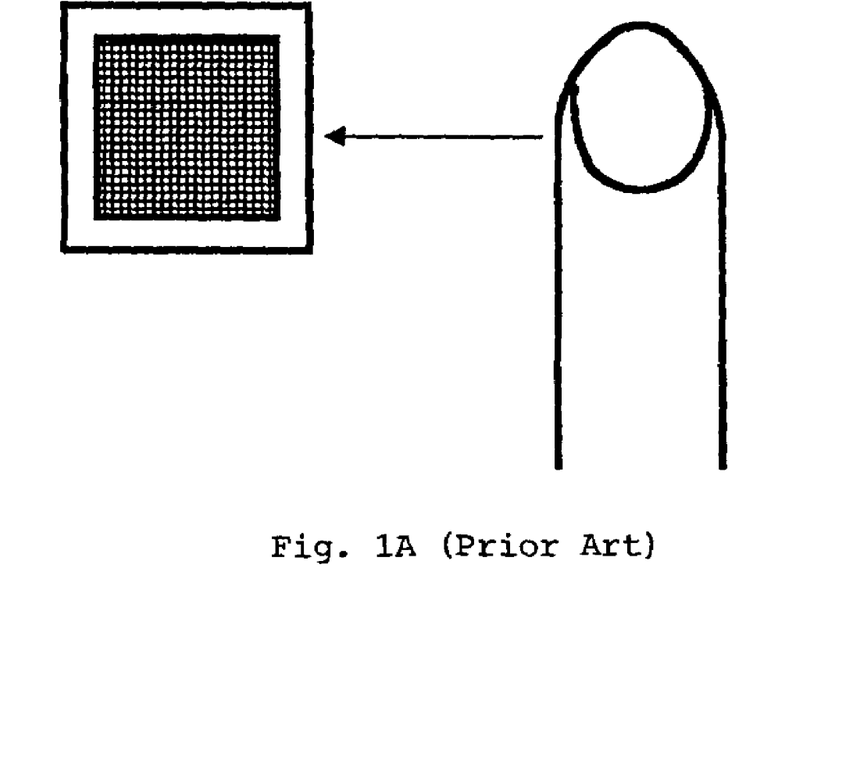
FIG. 1A is a plan view of a planar sensor.
Figure 1B:
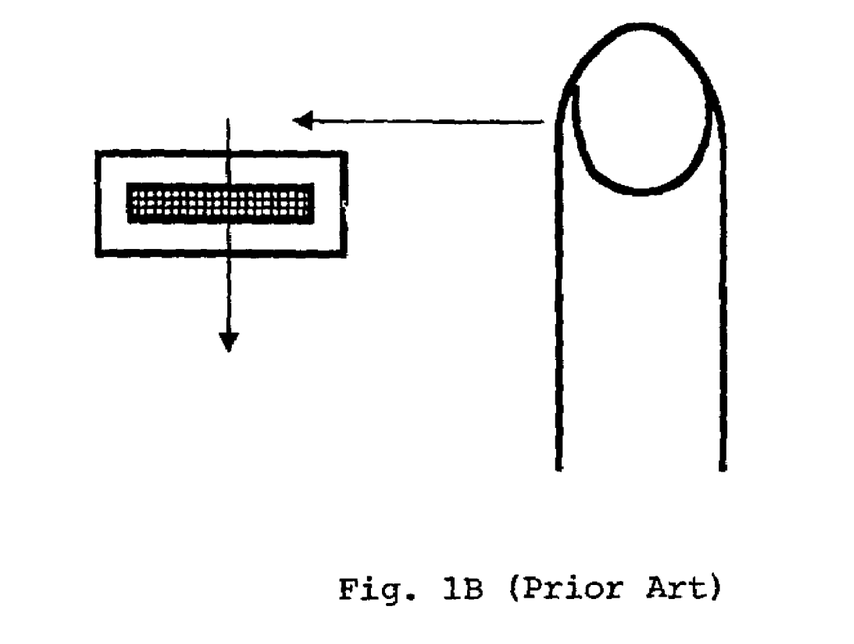
FIG. 1B is a plan view of a line sensor.

Many devices for reading fingerprints traditionally comprise a two-dimensional sensor, i.e., a planar sensor (see FIG. 1A of the accompanying drawings). However, the recent tendency toward small-size information terminals has drawn much attention to a one-dimensional sensor, i.e., a line sensor (see FIG. 1B of the accompanying drawing).

The line sensor is a device that has been developed for the purposes of achieving smaller sizes and low prices. A fingerprint reading sensor as an example of line sensor is a device for generating image data of a fingerprint from a number of sectional image (slice) data that are successively acquired when a finger is moved across the fingerprint reading sensor (such an action is hereinafter referred to as "sweeping").

One conventional line sensor that has been proposed as a fingerprint reading sensor is a fingerprint identifying device having a frame input unit, an optimum position calculator, a template image memory, a partial synthetic image memory, an image synthesizer, a checking feature extractor, a template checking feature memory, and a fingerprint feature checking unit (see, for example, JP-A-2002-42136). For reconstructing an overall image from a series of partial images entered from the frame entering unit, the optimum position calculator checks a partial image against a fingerprint image (template image) of the user that is stored in the template image memory to determine a position where the similarity is the highest, and the image synthesizer joins the partial image to a partial synthetic image that is stored in the partial synthetic image memory. The above process is carried out for each of partial images that are produced, thus generating a synthesized image. Then, the checking feature extractor extracts features from the synthesized image, and the fingerprint feature checking unit checks the extracted features against features in the template image that are stored in the template checking feature memory. The fingerprint identifying device is capable of confirming the user quickly and accurately using a group of partial images of the fingerprint that are produced by the relative movement between a sensor having a small area and the finger.

Figure 2A:
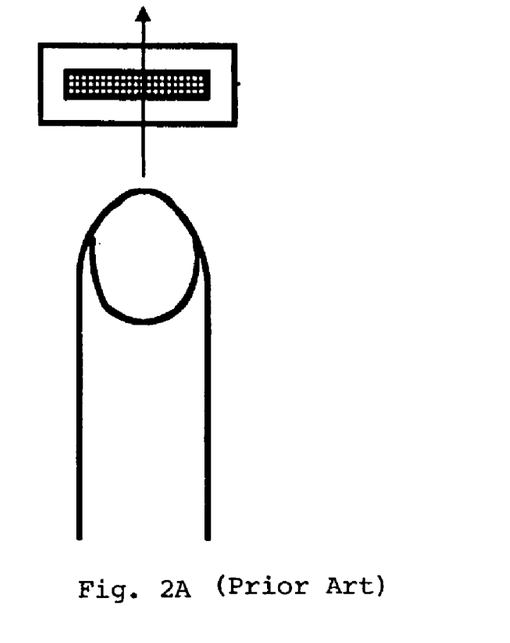
FIGS. 2A and 2B are plan views illustrative of a problem of a conventional line sensor.
Figure 2B:
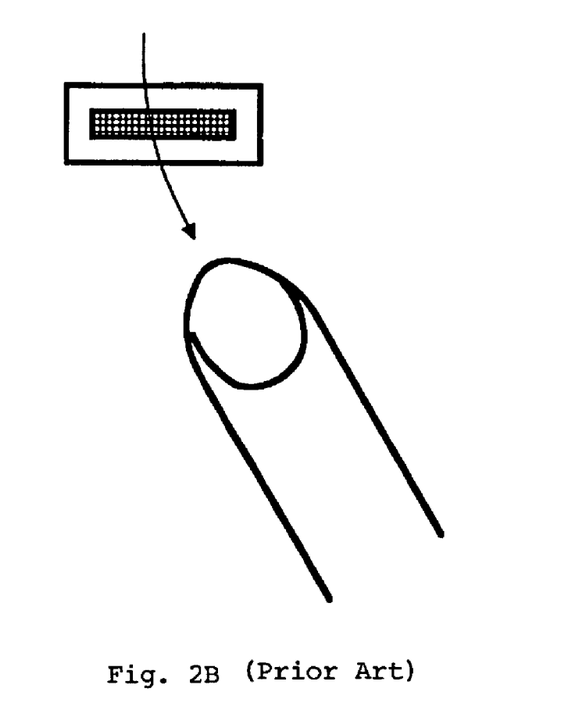

However, when fingerprint images are generated with the conventional line sensor, the user is likely to sweep the finger differently across the line sensor for various reasons. For example, the user may move the finger in a direction that is opposite to the direction which the user is expected to follow in sweeping the finger across line sensor (see FIG. 2A of the accompanying drawings), or the user may sweep the finger along a curved path across the line sensor because of the way the line sensor is installed or the motion of finger joints (see FIG. 2B of the accompanying drawings). If the finger does not sweep the line sensor as expected, then it is difficult for the line sensor to produce accurate fingerprint images.

The above problem occurs with not only fingerprint reading sensors, but also other line sensors such as sensors for use in scanners.

SUMMARY OF THE INVENTION

It is therefore an object of the present invention to provide an image processing apparatus, an image processing method, and a program which are capable of generating distortion-free accurate image data.

According to the present invention, an image processing apparatus comprises an image entering means for reading slice data, an image processing means for being supplied with slice data read by the image entering means and processing the supplied slice data into reconstructed image data, and a memory means for storing data. The memory means comprises a slice data storage means for storing slice data supplied to the image processing means, and a reconstructed image data storage means for storing reconstructed image data produced by the image processing means. The image processing means comprises a significance detecting means for determining whether the slice data stored in the slice data storage means is of significance or not, a moved distance/tilt calculating means for calculating a moved distance and tilt of the slice data that has been detected as being of significance by the significance detecting means, and reconstructed image data generating means for calculating positional coordinates of a reconstructed image area to which the slice data is to be projected, based on the moved distance and tilt of the slice data which has been calculated by the moved distance/tilt calculating means, and generating reconstructed image data.

A moved distance and tilt of the slice data that has been supplied from the image entering means are calculated, and positional coordinates of a reconstructed image area to which the slice data is to be projected are calculated based on the moved distance and tilt of the slice data which has been calculated by the moved distance/tilt calculating means, thus generating reconstructed image data. Therefore, the orientation of an object is detected, and image data can be reconstructed regardless of whether the sweep is normal or inverted. Furthermore, moved distance differences between the slice data and preceding slice data can be detected at a plurality of locations on the slice data, and image data can be reconstructed in a manner to follow a sweep (curved sweep) that is a combination of translation and turning movement. Therefore, it is possible to acquire image data which is substantially free of distortions. Accordingly, the image processing apparatus may, for example, be used in an application in which it is incorporated in a small-size information device for capturing a fingerprint while the user is holding the small-size information device with one hand. The image processing apparatus can be installed in a wide range of locations, has an increased value in its use, and finds a wide range of applications. Moreover, no hardware mechanism dedicated to the detection of a moved distance is required. As a result, the apparatus is simplified in structure and made up of a reduced number of parts, and hence can be manufactured in a reduced period of time at a reduced cost.

The image processing means may start processing the slice data if the slice data is determined to be of significance by the significance detecting means, and end processing the slice data if the slice data is determined to be of no significance by the significance detecting means.

The moved distance/tilt calculating means may calculate an overall moved distance and tilt of the slice data by determining relative positions of a plurality of moved distance detecting windows provided for the slice data.

The reconstructed image data generating means may divide each pixel of the slice data into fragments at a ratio of occupied areas with respect to a maximum of four pixels of the reconstructed image area onto which each pixel of the slice data is to be projected, and distribute the divided fragments to the pixels of the reconstructed image area, thereby generating the reconstructed image data.

The image entering means may comprise a fingerprint reading sensor, a sensor for use with a hand scanner, or a line sensor.

The above and other objects, features, and advantages of the present invention will become apparent from the following description with reference to the accompanying drawings which illustrate examples of the present invention.

DETAILED DESCRIPTION OF THE PREFERRED EMBODIMENTS

1st Embodiment

Figure 3:
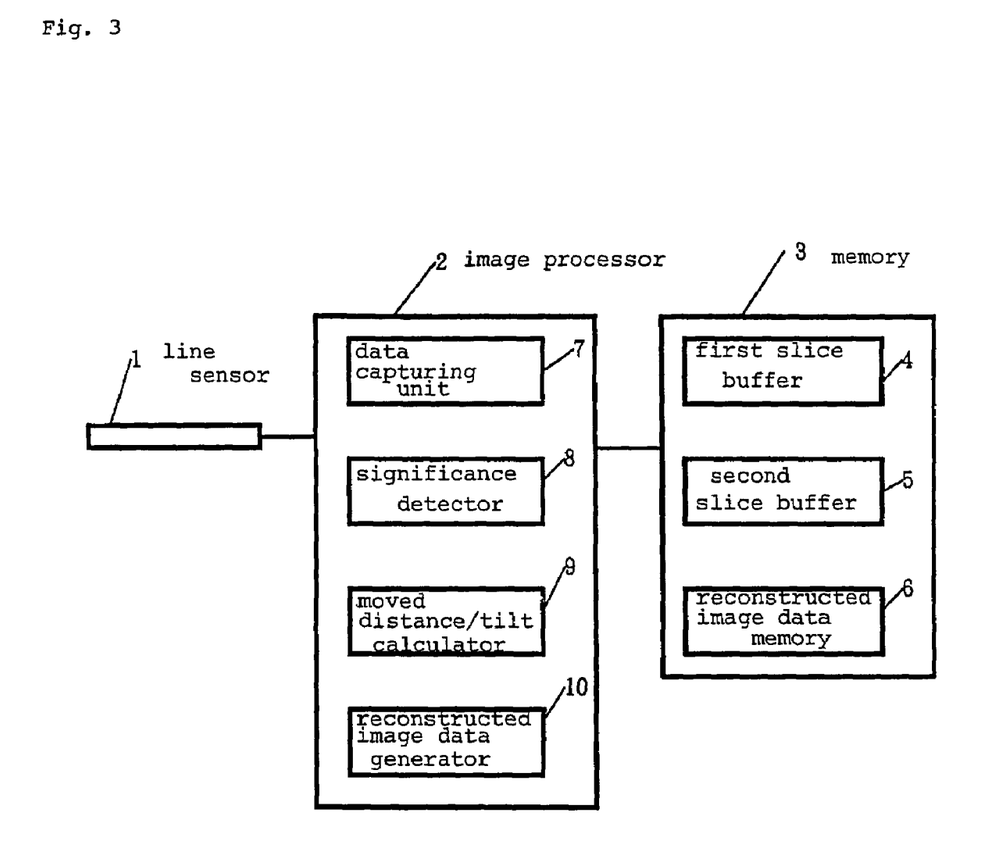
FIG. 3 is a block diagram of an image processing apparatus according to a first embodiment of the present invention.

As shown in FIG. 3, an image processing apparatus according to a first embodiment of the present invention comprises line sensor (image entering unit) 1, image processor 2 for being supplied with slice data that has been read by line sensor 1 and processing the supplied slice data, and memory 3.

Line sensor 1 comprises a one-dimensional scanner sensor capable of simultaneously capturing several lines of image data. Line sensor 1 has such characteristics and a shape that match an object whose image data are to be acquired. Line sensor 1 may be an optical, thermosensitive, a pressure-sensitive, or a charge capacitance (CMOS) sensor. Line sensor 1 should have as many pixels as required to meet a requirement for covering a minimum number of overlapping lines between successive slices in order to reconstruct a finger image, and should also have an operating speed large enough to respond to a sweeping action across line sensor 1. Alternatively, a conventional planar sensor may be used instead of line sensor 1. Though the image processing apparatus will be described in detail below with line sensor 1 used to read fingerprint image data, the image processing apparatus is not limited to such a fingerprint imaging application.

Memory 3 comprises a RAM and includes first and second slice buffers 4, 5 (slide data memory) for storing slice data supplied to image processor 2, and reconstructed image data memory 6 for storing reconstructed image data that has been processed by image processor 2.

Image processor 2 comprises a processor for processing image data. Image processor 2 has data capturing unit 7 for entering slice data read by line sensor 1 into first slice buffer 4 and second slice buffer 5, significance detector 8 for determining whether the slice data stored in first slice buffer 4 and second slice buffer 5 are of significance or not (i.e., contain a fingerprint or not), moved distance/tilt calculator 9 for calculating a moved distance and tilt of the slice data that has been detected as being of significance by significance detector 8, and reconstructed image data generator 10 for calculating positional coordinates of a reconstructed image area to which the slice data is to be projected, based on the moved distance and tilt of the slice data which have been calculated by moved distance/tilt calculator 9, and generating reconstructed image data.

Figure 4:
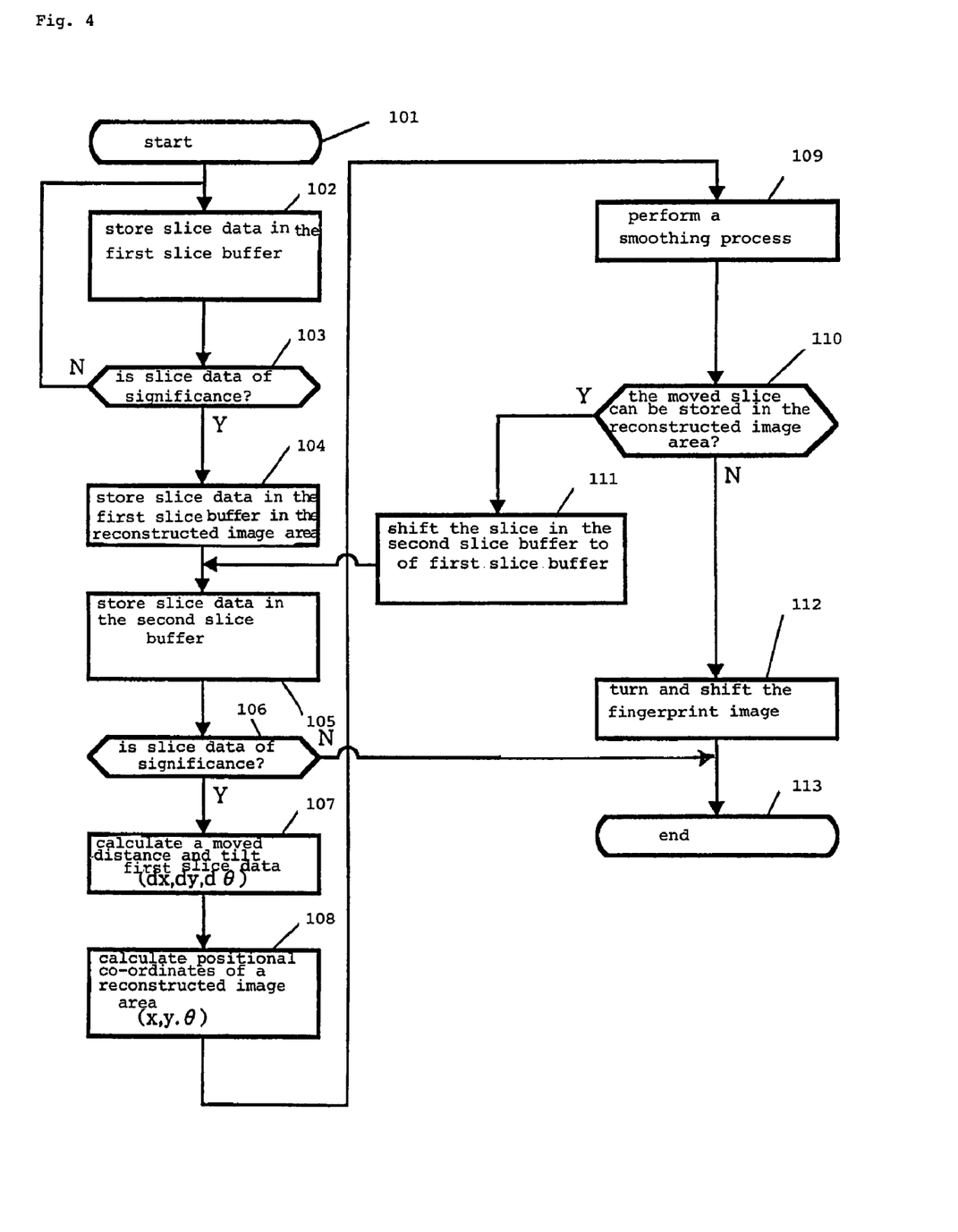
FIG. 4 is a flowchart of an operation sequence of the image processing apparatus according to the first embodiment.

FIG. 4 shows an operation sequence of the image processing apparatus according to the first embodiment.

After a fingerprint image starts being captured in step 101, data capturing unit 7 reads slice data from line sensor 1 and stores the slice data in first slice buffer 4 in step 102.

In step 103, significance detector 8 determines whether the slice data stored in first slice buffer 4 is of significance or not. If the slide data is not of significance, then control goes back to step 102 to read slice data from line sensor 1.

If the slide data is of significance in step 103, then it is judged that a finger has started sweeping line sensor 1. Significance detector 8 stores the slice data in first slice buffer 4 in a start position of a reconstructed image area in step 104.

Data significance is checked based on the fact that slice data that is read from line sensor 1 when the finger contacts line sensor 1 largely changes positively or negatively from preceding slice data. The manner in which the slice data changes depends on the characteristics of line sensor 1 used, the detector needs be corrected depends on the type of line sensor 1. According to the present embodiment, the slice data is judged as being of significance when at least a certain number of pixels detect being contacted by the finger.

Actually, line sensor 1 comprises a temperature sensor or an electrostatic capacitance sensor. Line sensor 1 provides a temperature difference or an electrostatic capacitance change as 16- or 256-level data per pixel. Significance detector 8 acquires the data output from line sensor 1 at given time intervals, and judges that the object, i.e., the finger, on line sensor 1 has moved if there is a large change between the output data at time t and the output data at time t+1 in the same pixel position.

In step 105, data capturing unit 7 reads next slice data from line sensor 1 and stores the slice data in second slice buffer 5. In step 106, significance detector 8 determines whether the slice data stored in second slice buffer 5 is of significance or not. If the slide data is not of significance, then significance detector 8 judges that the sweep is ended, and the acquisition of the fingerprint image is put to an end in step 113.

If the slide data is of significance in step 106, then moved distance/tilt calculator 9 compares the slice data stored in first slice buffer 4 and the slice data stored in second slice buffer 5 with each other and calculates a moved distance and tilt of the slice data in step 107.

Figure 5A:
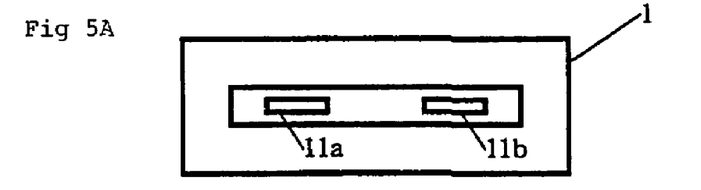
FIGS. 5A through 5D are diagrams illustrative of a process of calculating a moved distance and tilt of slice data.

FIGS. 5A through 5D are illustrative of a process of calculating a moved distance and tilt of slice data. As shown in FIG. 5A, a moved distance and tilt of slice data are calculated using two moved distance detecting windows 11a, 11b that are provided for the respective slice data. Specifically, one of the windows is fixed in position and the other window is moved vertically and horizontally to find windows having substantially the same data patterns. When the difference between the relative positions of the two windows is zero, the moved distance of the slide data is zero.

The relative positions of the two windows can change from an inverted sweep direction (negative) to a normal sweep direction (positive) and also in horizontal directions. Since the speed at which the finger sweeps does not change abruptly, an area for calculating the relative positions is narrowed down based on the preceding moved distance. Because the negative direction is supported, an image can be reconstructed accurately even when the finger sweeps across the sensor inversely or reciprocally. Even when the finger stops (the moved distance becomes zero) while sweeping across the sensor, an image can be reconstructed accurately.

Figure 5B:
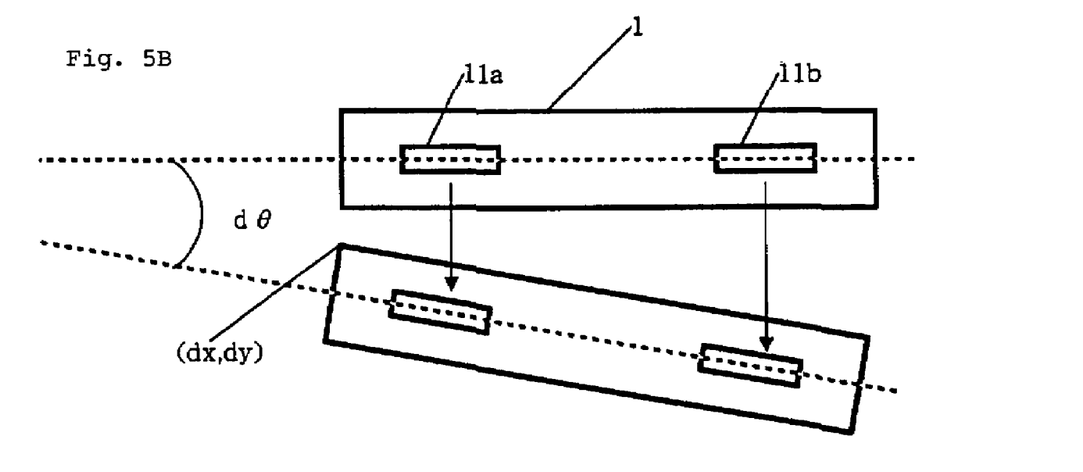
Figure 5C:
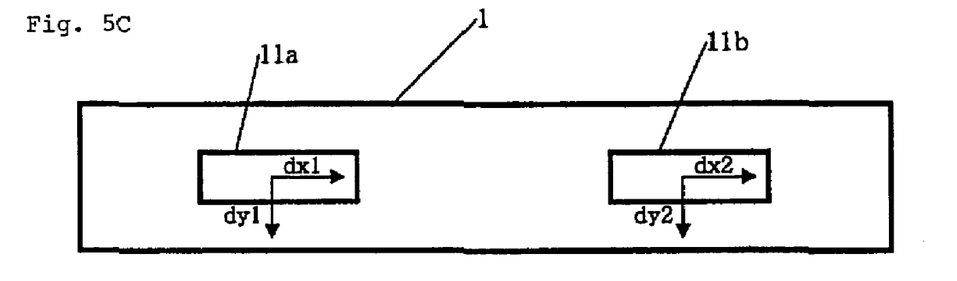

When the respective relative positions of two windows 11a, 11b are determined, a moved distance (dx, dy) and tilt (dθ) of the slice are calculated from the determined relative positions (see FIG. 5B). Specifically, coordinates of an upper left end of the slice (relative coordinates with respect to the preceding slice) are calculated based on dx, dy that have been calculated for each of the windows. If there are two windows, then providing moved distance differences with respect to individual windows 11a, 11b are represented by (dx1, dy1), (dx2, dy2), as shown in FIG. 5C. Since dx1, dx2 are of substantially the same values because of the structure of the sensor, their representative value is determined by averaging them. Thus, $$dx=(dx1+dx2)/2 \quad (1)$$

Figure 5D:
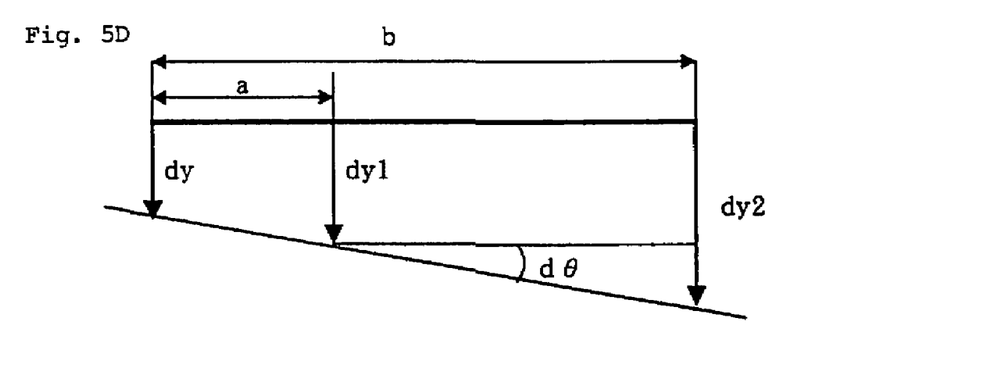

Inasmuch as the difference between dy1, dy2 serves as a parameter that determines the tilt between the slices, dy at the upper left end and dθ are determined using the ratio of the distances from the left end to the respective windows. Specifically, if the distance between dy1 and dy is indicated by a and the distance between dy2 and d6 by b as shown in FIG. 5D, then $$(dy1-dy)/a=(dy2-dy)/b$$

and hence, $$dy=a\times dy2/(a-b)-b\times dy1/(a-b)$$

$$dy=R1\times dy1-dy2 \quad (2)$$

where R1 is of an inherent value depending on the positions of the windows, and varies depending on the ratio of a and b.

Furthermore, $$\tan d\theta=(dy2-dy1)/(b-a)$$

and hence, $$d\theta=a\tan((dy2-dy1)\times R2) \quad (3)$$

where R2 is of an inherent value depending on the positions of the windows, and varies depending on the ratio of a and b.

In step 108, reconstructed image data generator 10 calculates positional coordinates (absolute coordinates) of a reconstructed image area where data is to be stored next, from the position of the preceding slice stored in the reconstructed image area and the moved distance and tilt which have been detected by moved distance/tilt calculator 9, and stores (maps) the slice in second slice buffer 5 in the reconstructed image area.

Figure 6:
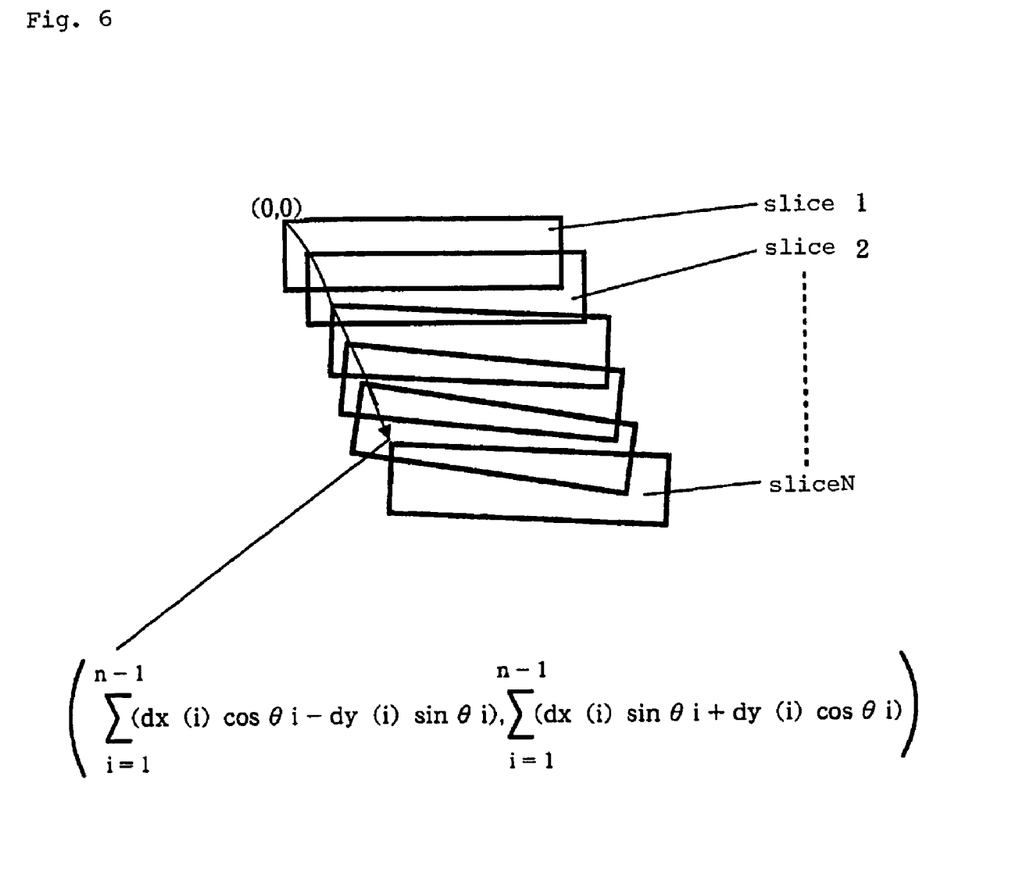
FIG. 6 is a diagram illustrative of positional coordinates (absolute coordinates) of a reconstructed image area.

The absolute coordinates are calculated using dx, dy, dθ according to the following equations (see FIG. 6):

$$x=\Sigma(dx\times\cos\theta-dy\times\sin\theta) \quad (4)$$

$$y=\Sigma(dx\times\sin\theta+dy\times\cos\theta) \quad (5)$$

$$\theta=\Sigma d\theta \quad (6)$$

The above equations serve to calculate actual coordinates, and accumulate relative coordinates that have been calculated each time slice data is acquired, thereby determining relative coordinates from the time when the sweep started, i.e., absolute coordinates if the time when the sweep started is set to 0. x, y, θ at the time n slice data are acquired represent the sums of dx, dy, dθ that have been derived from the 1st slice to the nth slice. If dx(i), dy(i), dθ(i) indicate a moved distance and tilt between the ith slice data and the (i+1)th slice data determined according to the equations (4) through (6), then the following equations are satisfied:

$$x(i)=\sum_{i=1}^{n-1}(dx(i)\cos\theta(i)-dy(i)\sin\theta(i)) \quad (7)$$

$$y(i)=\sum_{i=1}^{n-1}(dx(i)\sin\theta(i)+dy(i)\cos\theta(i)) \quad (8)$$

$$\theta(i)=\sum_{i=1}^{n-1}d\theta(i) \quad (9)$$

Using the coordinates (x, y) and the angle θ thus calculated, the slice data is projected (mapped) onto reconstructed image data.

If the moved distance has a value that is not exactly divisible by the length of a pixel or the angle dθ has a value other than zero, then a slice to be stored is not in 1-to-1 correspondence to pixels in the reconstructed image area. Specifically, a pixel of the slice is distributed and projected onto a maximum of four pixels of the reconstructed image area at the time of mapping (see FIG. 7).

Figure 7:
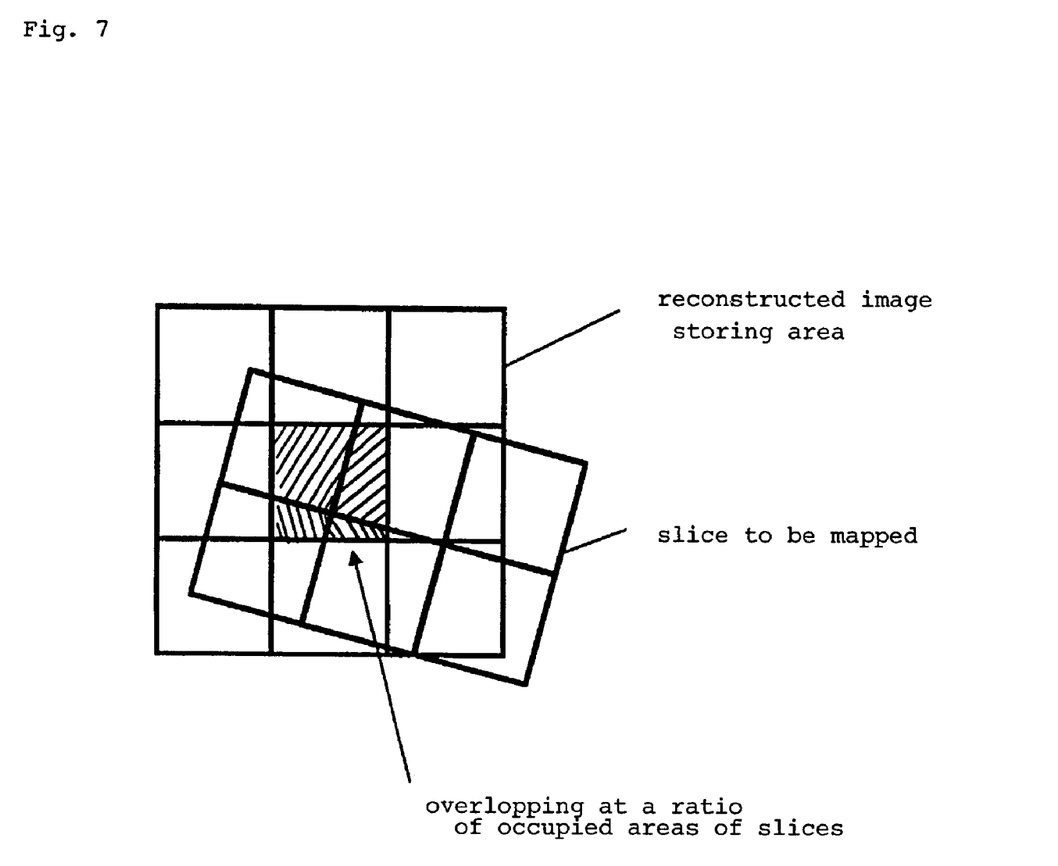
FIG. 7 is a diagram illustrative of a process of mapping slice data to the reconstructed image area.

If coordinates are determined simply in agreement with the pixel pitch, then continuity at the boundaries is lost, making it impossible to reconstruct a good fingerprint image. To solve this problem, reconstructed image data generator 10 performs a smoothing process in step 109 by dividing each pixel of the slice into fragments at a ratio of occupied areas with respect to a maximum of four pixels of the reconstructed image area onto which each pixel of the slice is to be projected, and distributing the divided fragments to the pixels of the reconstructed image area. Specifically, coordinates to be projected and a projection value for a pixel having coordinates (sx, sy) on the slice data and three pixels that are positioned rightward, downward, and rightward and downward of the pixel are calculated.

When the coordinates of the upper left end of an ith slice are indicated by x(i), y(i), the slice data is inclined at θ(i) from those coordinates, the projected coordinates of a pixel on the slide data are expressed by:

$$(x+sx\times\cos\theta-sy\times\sin\theta, y+sx\times\sin\theta+sy\times\cos\theta) \quad (10)$$

The projection value is expressed by:

$$difx\times dify\times s(sx,sy)+difx\times(1-dify)\times s(sx,sy+1)+(1-difx)\times dify\times s(sx+1,sy)+(1-difx)\times(1-dify)\times s(sx+1,sy+1) \quad (11)$$

where (x, y) represent the absolute coordinates of a slice which have been calculated previously, difx, dify the differences (a value from 0 to 1) between the absolute coordinates and slice coordinates, and s(x, y) the value of a pixel on the slice.

Actually, one pixel has such a feature that when it is converted to a coordinate value, it has a size of 64 times, for example (if a certain pixel is of coordinates (0, 0), then a right pixel next thereto has coordinates (64, 0)). By thus determining coordinates with higher accuracy than pixels, it is possible to handle intermediate positions and tilts. Equation (11) serves to project coordinate values onto actual pixel units.

Projected pixels surrounded by a region of four adjacent pixels (S(sx, sy)–S(sx+1, sy+1)) on slice data are calculated according a ratio of occupied areas of the four pixel data. The occupied areas are expressed by the variables difx, dify in equation (11).

The moved slice is stored in the reconstructed image area of reconstructed image data memory 6.

Then, in step 110, reconstructed image data generator 10 determines whether the moved slice can be stored in the reconstructed image area or not. If the moved slice can be stored in the reconstructed image area, then the slice in second slice buffer 5 is shifted to first slice buffer 4 in step 111, and then a next slice is read. If the reconstructed image area is full and cannot store more slice data, then a next slice is not read, and the acquisition of the fingerprint image is put to an end in step 113.

Rather than shifting the slice in second slice buffer 5 to first slice buffer 4, the two buffers may alternately be used to carry out the same process as described above.

Figure 8A:
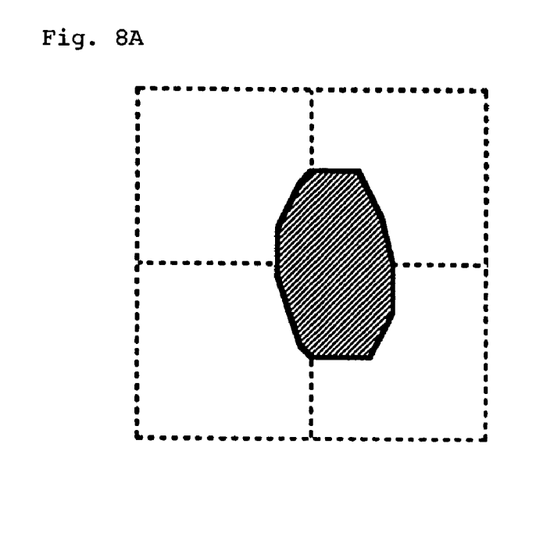
FIGS. 8A through 8D are diagrams illustrative of the manner in which a fingerprint image is divided, rotated, and shifted.
Figure 8B:
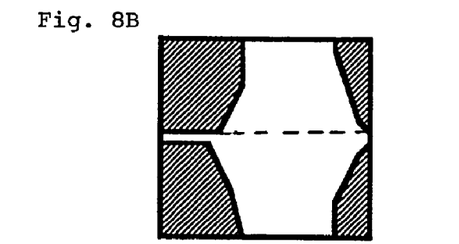
Figure 8C:
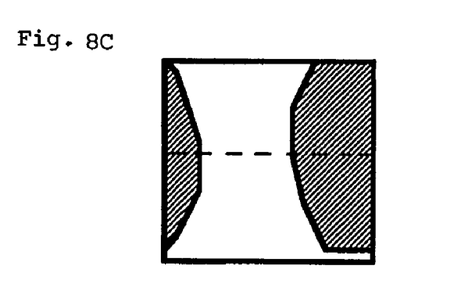
Figure 8D:
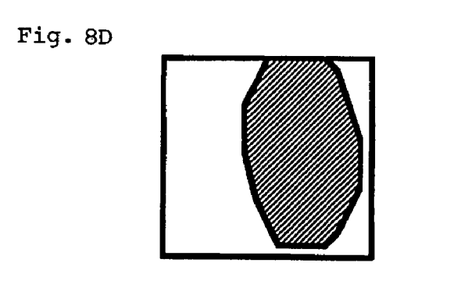

The coordinates in the reconstructed image area are endless because of wraparound. Specifically, when the absolute coordinates of a new slice overflow an end of the reconstructed image area, they are stored in the other end of the reconstructed image area, so that the slice data will not be lost. However, since the slice data thus stored would not constitute a single continuous fingerprint image, after the acquisition of a fingerprint image is put to an end, a true starting point of the fingerprint image in the reconstructed image area is determined (see FIG. 8A), the image is vertically divided about the starting point (see FIG. 8B), then turned 180° (see FIG. 8C), and shifted horizontally (see FIG. 8D), thus producing a proper fingerprint image in step 112.

If a sufficient working area is available for an image to be generated, then the processing of step 112 may be dispensed with by setting the center of the working area to coordinates (0, 0).

Figure 9A:
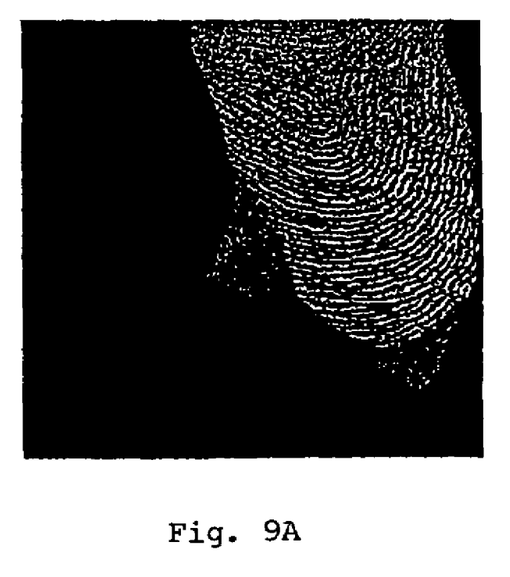
FIG. 9A is a diagram showing a fingerprint image generated according to the present invention.
Figure 9B:
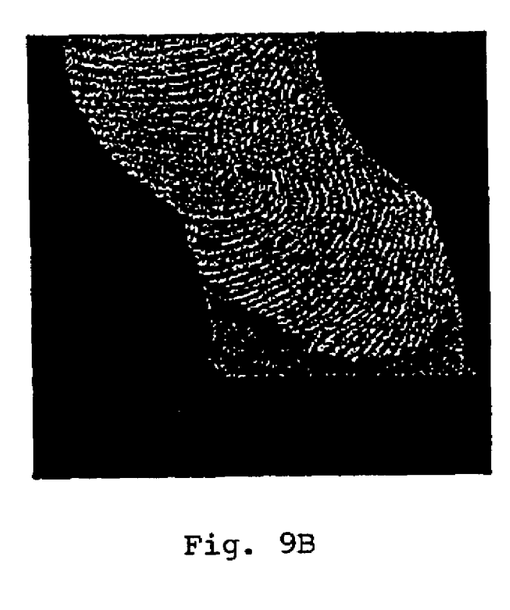
FIG. 9B is a diagram showing a fingerprint image generated according to a conventional process.

The fingerprint image thus reconstructed is shown in FIG. 9A. As a comparative example, FIG. 9B shows an image acquired as a sweep image by a conventional process which is incapable of handling rotation. In FIGS. 9A and 9B, the images are produced when the finger sweeps the line sensor while being intentionally turned counterclockwise. It can be seen that the fingerprint image shown in FIG. 9A is essentially free of distortions.

According to the first embodiment, a moved distance and tilt of slice data acquired from line sensor 1 are calculated, and positional coordinates of a reconstructed image area to which the slice data is to be projected are calculated based on the calculated moved distance and tilt of the slice data, thereby generating reconstructed image data. Therefore, the orientation of the sweep is detected, and the image data can be reconstructed regardless of whether the sweep is normal or inverse. Furthermore, moved distance differences between the slice data and preceding slice data can be detected at a plurality of locations on the slice data, and image data can be reconstructed in a manner to follow a sweep (curved sweep) that is a combination of translation and turning movement. Even when the movement of the finger is curved or tortuous with respect to line sensor 1, or the finger sweeps line sensor 1 in an inverse direction, it is possible according to the present embodiment to reconstruct a fingerprint image that is equivalent to a fingerprint image which would be produced if the finger sweeps line sensor 1 in the normal direction. Accordingly, the image processing apparatus can be installed in a place where distorted fingerprint images would heretofore be captured, for capturing fingerprint images that are equivalent to those acquired by planar sensors and in other installed locations. As a result, the image processing apparatus may, for example, be used in an application in which it is incorporated in a small-size information device for capturing a fingerprint while the user is holding the small-size information device with one hand. The image processing apparatus can be installed in a wide range of locations, has an increased value in its use, and finds a wide range of applications.

2nd Embodiment

According to the first embodiment, the image processing apparatus has two slice buffers. However, the image processing apparatus may have a single slice buffer having a sufficient capacity required for a single sweep.

The image processing apparatus with the single slice buffer needs a large buffer area, but is advantageous when line sensor 1 is slow in speed or the processor has an insufficient processing capability. This is because the single slice buffer can read slices successively and subsequently carry out an image reconstruction process altogether, so that more overlaps of the slices can be obtained than with the first embodiment. The more the overlaps of the slices, the better the reconstructed image data.

3rd Embodiment

According to the first embodiment, the image processing apparatus has two moved distance detecting windows. However, the image processing apparatus may have three or more moved distance detecting windows. With the three or more moved distance detecting windows, it is possible to accurately generate an image even if the finger sweeps the sensor while in contact with about one-half of the area of the sensor.

If there are N moved distance detecting windows, then since the number of windows is increased in order to increase the accuracy with which to detect a moved distance and tilt, the accuracy of individual windows is checked and then a moved distance is detected from an optimum point. Specifically, dx values of individual windows are compared, and their average is determined after eliminating any data that are greatly different from other data. Then, dy and d$\theta$ are determined between the remaining windows. For example, if three windows have remained, three dy and d$\theta$, and if four windows have remained, six dy and d$\theta$, are produced according to equations (2), (3). Therefore, these values are averaged into dx, dy, d$\theta$. R1, R2 in equations (2), (3) change from window to window as they depend on the position of the window.

4th Embodiment

By recognizing the direction of a sweep, it is possible not to reconstruct an image when the finger sweeps the line sensor in a direction which is opposite to the direction in which the finger has started sweeping the line sensor. According to this process, even if line sensor 1 is a directional line sensor (a sensor which outputs an image of different characteristics when swept in a direction inverse to the normal direction), an image can properly be generated. With this arrangement, when the finger sweeps the line sensor in the inverse direction, only coordinates are converted, and no data is projected onto a storage area.

5th Embodiment

Figure 10:
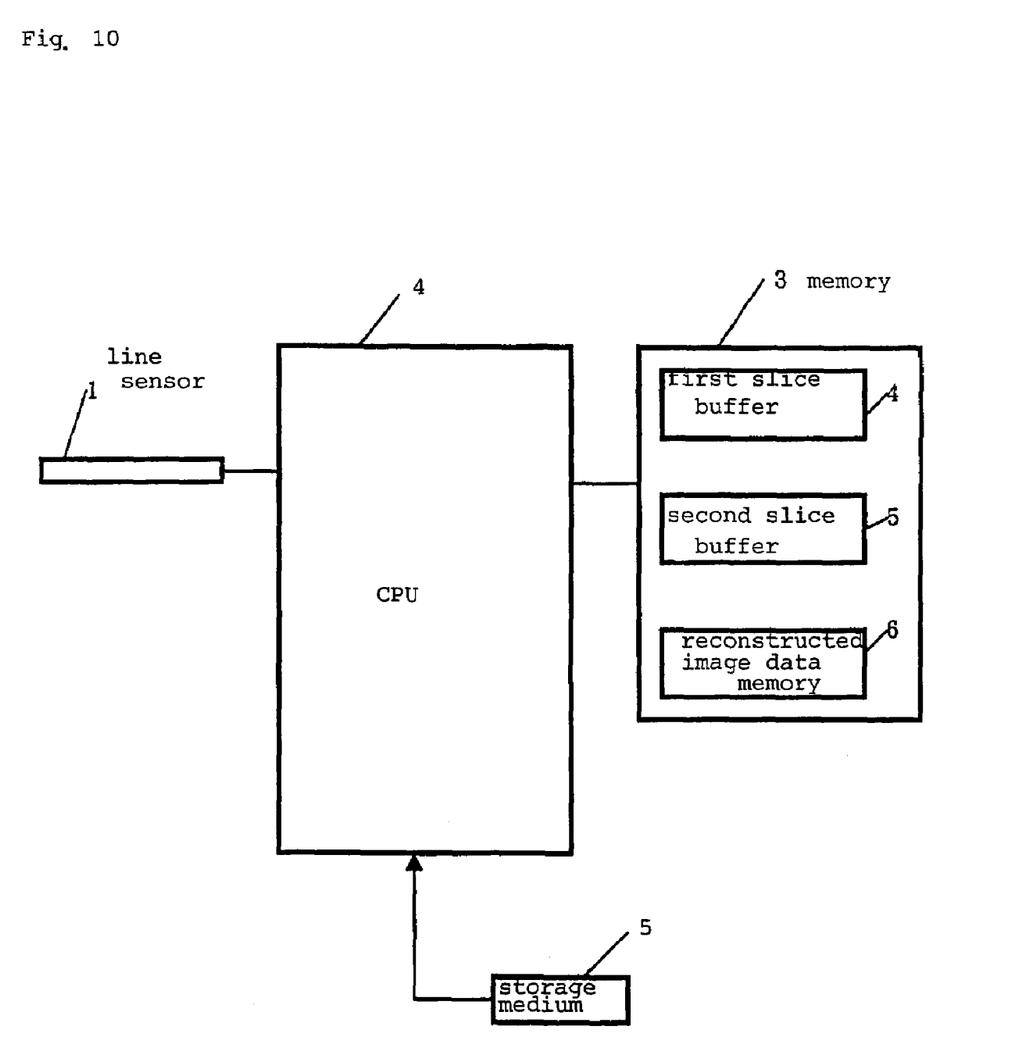
FIG. 10 is a block diagram of an image processing apparatus according to a fifth embodiment of the present invention.

FIG. 10 shows in block form an image processing apparatus according to a fifth embodiment of the present invention. According to the fifth embodiment, an image processing program for enabling computer 4 to carry out the operation sequence of image processor 2 described above according to the first through fourth embodiments is stored in storage medium 5, and the CPU of computer 4 reads the image processing program from storage medium 5. Storage medium 5 may comprise a magnetic disk such as an FD or the like, an optical disk such as a CD-ROM or the like, or a recording medium such as a semiconductor memory or the like. The image processing program may be downloaded via a communication network, rather than being stored in storage medium 5.

The present invention is not limited to the above embodiments, but various changes and modifications may be made therein without departing from the technical scope of the invention as defined in claims.

For example, the present invention is concerned with an algorithm for generating an original image from a succession of slice images, and is applicable to anything insofar as it serves the purpose of reconstructing an image with the same arrangement. For example, the present invention is applicable to a hand scanner or the like. Existing hand scanners have a mechanism for detecting a moving speed, e.g., a roller or a sensor, disposed near an image sensor. According to the present invention, such a mechanism may be dispensed with. As a result, the apparatus is simplified in structure and made up of a reduced number of parts, and hence can be manufactured in a reduced period of time at a reduced cost.

The algorithm according to the present invention causes no distortion on a generated image even when an object is scanned along a curved path.

If only the moved distance detector is used, the image processing apparatus according to the present invention may be used as a pointing device having a scrolling function, a cursor moving function, or an alternative mouse function. Specifically, the image processing apparatus according to the present invention may switch between a fingerprint entering device and a scrolling function.

Furthermore, since the present invention makes it possible to detect a tilt, a rotation can be detected by integrating a detected tilt. A device which has no actuator and is capable of entering a tilt and angular displacement may be used in various applications as an alternative to a dial or a volume.

While preferred embodiments of the present invention have been described using specific terms, such description is for illustrative purposes only, and it is to be understood that changes and variations may be made without departing from the spirit or scope of the following claims.

What is claimed is:

1. An image processing apparatus comprising:
    image entering means for reading slice data;
    image processing means for being supplied with slice data read by said image entering means and processing the supplied slice data into reconstructed image data; and
    memory means for storing data;
    said memory means comprising:
    slice data storage means for storing slice data supplied to said image processing means; and
    reconstructed image data storage means for storing reconstructed image data produced by said image processing means;
    said image processing means comprising:
    significance detecting means for determining whether the slice data stored in said slice data storage means is of significance or not;
    moved distance/tilt calculating means for calculating a moved distance and tilt of the slice data that has been detected as being of significance by said significance detecting means; and
    reconstructed image data generating means for calculating positional coordinates of a reconstructed image area to which said slice data is to be projected, based on the moved distance and tilt of the slice data which has been calculated by said moved distance/tilt calculating means, and generating reconstructed image data.

2. An image processing apparatus according to claim 1, wherein said image processing means comprises means for starting processing the slice data if the slice data is determined to be of significance by said significance detecting means, and ending processing the slice data if the slice data is determined to be of no significance by said significance detecting means.

3. An image processing apparatus according to claim 1, wherein said moved distance/tilt calculating means comprises means for calculating an overall moved distance and tilt of the slice data by determining relative positions of a plurality of moved distance detecting windows provided for the slice data.

4. An image processing apparatus according to claim 1, wherein said reconstructed image data generating means comprises means for dividing each pixel of the slice data into fragments at a ratio of occupied areas with respect to a maximum of four pixels of said reconstructed image area onto which each pixel of the slice data is to be projected, and distributing the divided fragments to the pixels of said reconstructed image area, thereby generating the reconstructed image data.

5. An image processing apparatus according to claim 1, wherein said image entering means comprises a fingerprint reading sensor.

6. An image processing apparatus according to claim 1, wherein said image entering means comprises a sensor for use with a hand scanner.

7. An image processing apparatus according to claim 1, wherein said image entering means comprises a line sensor.

8. A method of processing an image, comprising the steps of:
   storing slice data read by an image entering unit;
   detecting significance of the stored slice data;
   calculating a moved distance and tilt of the slice data which has been detected as being of significance;
   calculating positional coordinates of a reconstructed image area to which said slice data is to be projected, based on the moved distance and tilt of the slice data which have been calculated, and generating reconstructed image data; and
   storing the generated reconstructed image data.

9. A computer-readable medium encoded with a computer program enabling a computer to process an image, computer-readable medium comprising:
   a first instruction set enabling the computer to store slice data read by an image entering unit;
   a second instruction set enabling the computer to detect a significance of the stored slice data;
   a third instruction set enabling the computer to calculate a moved distance and tilt of the slice data which has been detected as being of significance;
   a fourth instruction set enabling the computer to calculate positional coordinates of a reconstructed image area to which said slice data is to be projected, based on the moved distance and tilt of the slice data which have been calculated, and to generate a reconstructed image data; and
   a fifth instruction set enabling the computer to store the generated reconstructed image data in a memory.

* * * * *